Oct. 12, 1937.  R. W. SKOPEC  2,095,481

MULTIPLE PURPOSE ADAPTER AND RETENTION CLIP

Filed Dec. 19, 1936

Inventor

Richard W. Skopec

By Clarence A. O'Brien
Hyman Berman
Attorneys

Patented Oct. 12, 1937

2,095,481

UNITED STATES PATENT OFFICE 2,095,481

MULTIPLE PURPOSE ADAPTER AND RETENTION CLIP

Richard W. Skopec, Western, Nebr.

Application December 19, 1936, Serial No. 116,786

2 Claims. (Cl. 40—21)

The present invention relates to special fasteners embodying so-called quick applicable and removable resilient clips and clasps, and has reference in particular to a substantially U-shaped retaining clip susceptible of use in various lines of endeavor and highly satisfactory for use in holding in place personal identification badges, tags and the like.

More specifically, the preferred embodiment of the invention embodies a substantially U-shaped flat metal strap of requisite resiliency having its free connectible ends so constructed as to accommodate a badge or the like and to at the same time facilitate releasable connection with a hat band, belt, buttonhole or the like.

As before indicated while the improved clip is designed for variegated utility it may be used to greatest advantage in attaching fishing and hunting license badges, badges worn by firemen and policemen and members of the press, whereby to dispose and hold in a conspicuous place the badge on the user's clothing.

Other features and advantages, primarily of a structural nature, will become more readily apparent from the following description and accompanying illustrative drawing.

In the drawing, wherein like numerals are employed to designate like parts throughout the views.

Figure 1:
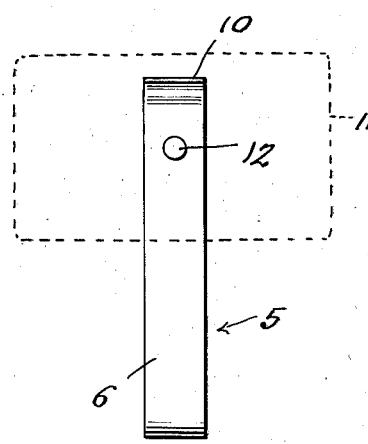
Figure 1 is an elevational view looking at what may be called the front of the clip and showing, in dotted lines, how a badge or identification ticket is associated therewith.

Referring now to the drawing by distinguishing reference numerals it will be observed that the clip or clasp, as a unit, is denoted by the numeral 5. As before indicated it is formed from a single flat strip of resilient metal one end of which may be designated as the relatively stationary member 6 and the other end of which, indicated at 7, forms a relatively movable member as well as a retaining latch. The free end portion of the so-called latch 7 is provided with a keyhole slot including an enlarged portion 8 and a restricted seat portion 9.

The extremity of the member 6 is bent or flared laterally as indicated at 10 and is adapted to press resiliently against the badge or other equivalent part 11 to provide the desired spring retention action. This part 10 may be conveniently denoted as a detent. Inwardly of the detent is a triple headed stud or rivet. The stem portion 15 is mounted in the member 6 and on the outer end thereof are spaced elements defining collars 12 between which the tag, badge or other part 11 is maintained in place. On the inner end is a disk-like head 13 of a diameter permitted to slip through the aperture 8, after which it is shifted or lodged in the seat 9 to secure the extremity 14 against the detent 10.

Figure 2:
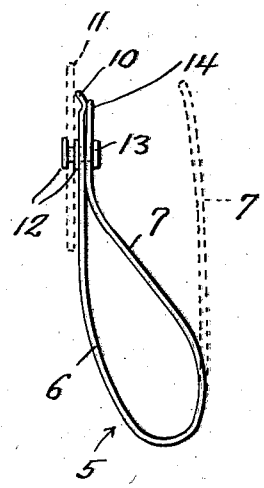
Figure 2 is a side elevational or edge view of the unit depicted in front view in Figure 1.
Figure 3:
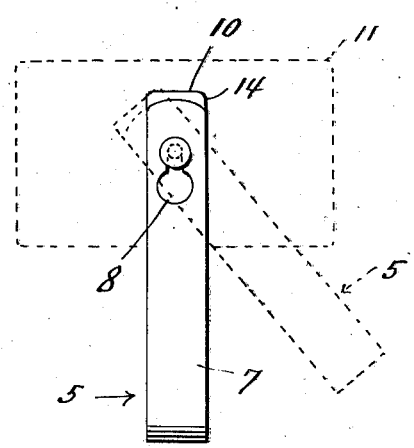
Figure 3 is a reverse or rear elevational view of Figure 1 or a view of Figure 2 observing it in a direction from right to left.
Figure 4:
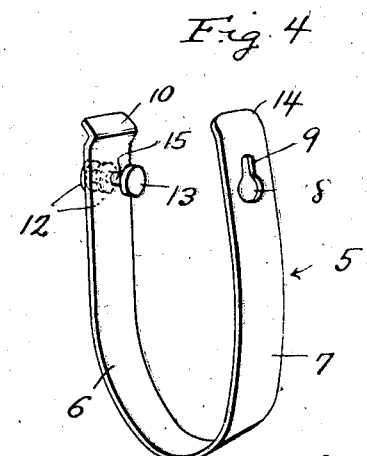
Figure 4 is a perspective view of the complete clip with its disconnectible ends separated.

It is obvious that the inherent resiliency of the latch-end 7 is such as to cause it to swing normally away from the end 6 as indicated in dotted lines in Figure 2. By thus putting the end portion 7 under pressure and flexing it toward the end 6 the keyhole slot may be attached to the keeper head 13 to maintain both ends joined and to define a loop susceptible of connection with a hat band or belt or buttonhole in a lapel, or elsewhere on the wearing apparel of a person.

It is to be observed that when the terminals or free ends of the companion members 6 and 7 are joined together in retaining loop-forming position shown in Figure 2, the detent 10 bears against the adjacent surface of the badge 11 holding the badge against rotation. The connection is, however, a frictional one and it is possible to turn the badge in relation to the clip 5 or to turn the clip 5 to any angle to maintain the badge in proper inspecting position.

Being of utmost simplicity in construction, use and operation, and aptly fitted for innumerable purposes, it is believed that the nature and purposes of the invention will be evident to those skilled in the art to which the invention pertains.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:—

1. In combination with an identification card, a device for attaching said card to the wearing apparel of a person and comprising, a substantially U-shaped strip of resilient material, and means adjacent one end of said strip for attaching the card to said end for rotation thereon in different positions, said end being outwardly bent to bear against the card and frictionally oppose rotation thereof, the ends of said strip being provided with cooperating devices for detachably attaching the same together to form a loop for attachment of the device to said wearing apparel.

2. In combination with an identification card, means for attaching said card to the wearing apparel of a person and comprising, a substantially U-shaped strip of resilient material, means adjacent one end of the strip for attaching the card to said end for rotation into different positions and comprising a rivet having a pair of outer and inner end flanges upon opposite sides of said end, respectively, said end of the strip being outwardly bent to bear against said card and frictionally oppose rotation thereof, the other end of the strip being provided with a key-hole slot for detachably attaching said other end to the inner end flange of said rivet to form a loop for attachment of the device to said wearing apparel.

RICHARD W. SKOPEC.